INVENTORS
GILBERT H. BACHELET
DESIRE BRUIET
By Irwin S. Thompson
ATTY.

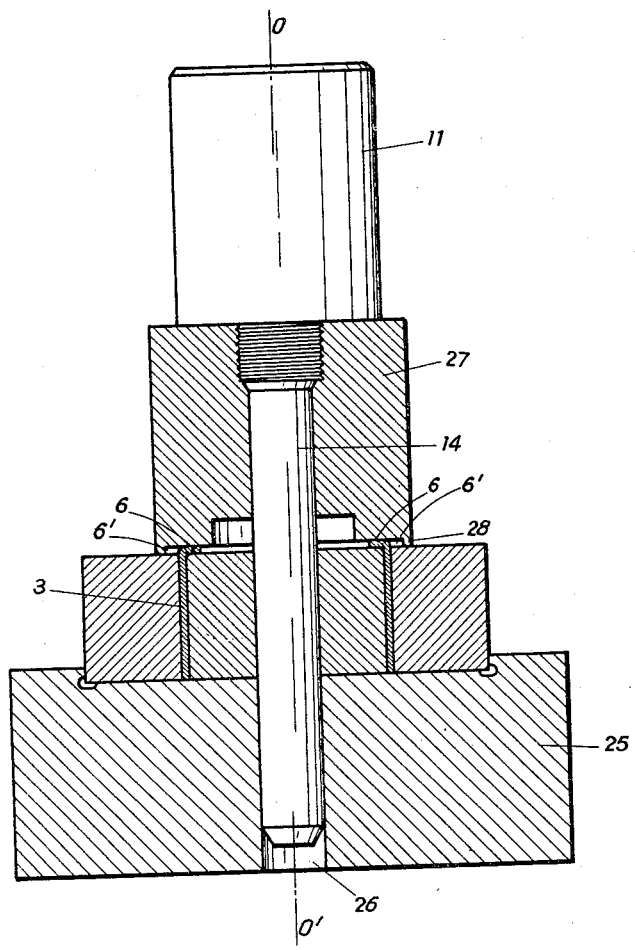

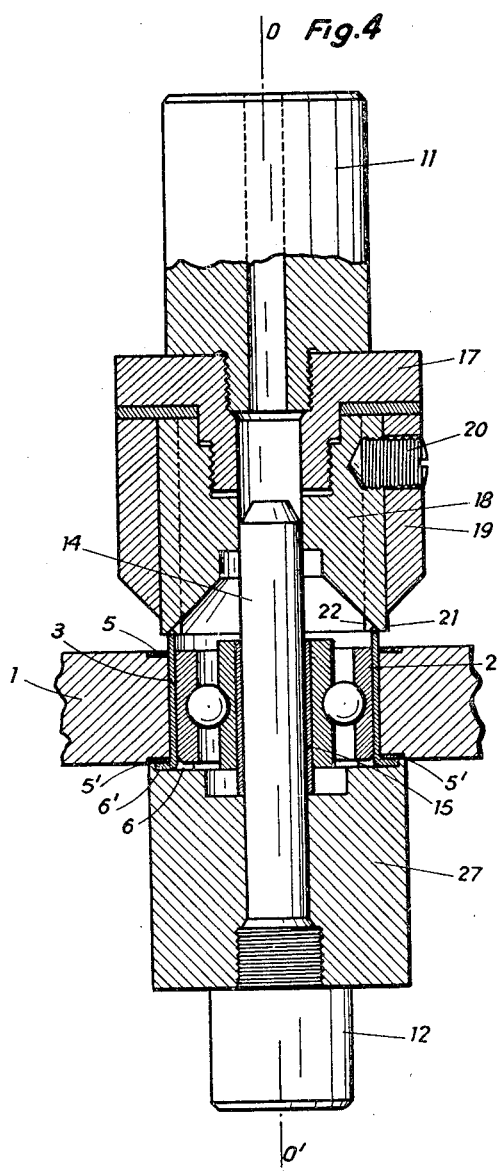

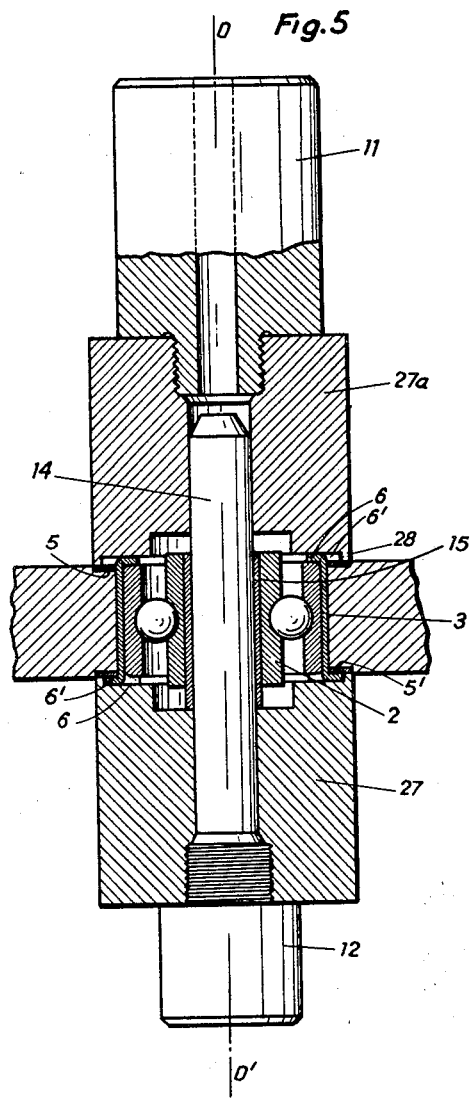

United States Patent Office 3,128,819
Patented Apr. 14, 1964

3,128,819
TOOLS FOR USE IN CRIMPING THE HOLDING RACES OF ROLLER OR BALL BEARINGS
Gilbert H. Bachelet and Désiré Bruiet, Orly, France, assignors to Air France, Paris, France
Filed Mar. 3, 1961, Ser. No. 93,241
Claims priority, application France July 16, 1960
3 Claims. (Cl. 153—2)

This invention relates to tools for use in crimping the cylindrical holding sleeves of roller or ball bearings.

The object of the present invention is a tool which enables the satisfactory crimping of the holding sleeves which prevent any axial displacement of the ball or roller bearings in their supports, in accordance with the process described in our copending patent application Serial Number 111,672, filed on May 22, 1961

Said tool, in accordance with the process of the aforesaid patent application, operates:

(a) in a preliminary pass to cut, and bend through approximately 45° small tongues which are bent back alternately in two series respectively towards the inside and the outside of the bore containing the bearing, at the two ends of the said bore and, (b) in a second pass, to bend back the said tongues completely flat, the one series against the adjacent face of the bearing and the other series against the protective disc or washer located on the support and encircling the cylindrical sleeve.

Throughout the following description, said first series of tongues will be designated "inner tongues" and said second series will be designated "outer tongues" by reason of their respective locations with reference to the principal axis of the bearing.

According to the present invention, these results are obtained during the first pass by a punch comprising an annular device having at its rim a continuous peripheral series of wedge faces with adjacent wedge faces sloped oppositely to each other and disposed crosswise relatively to each other so that the series of wedge faces presents a peripheral V-groove to receive the rim of the sleeve, and relative axial movement between the device and the sleeve causes simultaneously axial shearing of the sleeve rim into a peripheral series of tongues, and bending of adjacent tongues in opposite directions. The second pass, which completes the folding back through 90° of the tongues, the one series on the face of the bearing and the other on the support's disc or washer is performed by a punch having at its end a flat face with an outer rim restricting the bending and simultaneously smoothing the disc or washer.

It is possible to make each of the two successive passes with two punch carrying arbors, one on each side of the bearing, and to cut, bend and fold back the tongues on to the two surfaces of the bearing and the two support discs or washers; however, this manner of operating is rather delicate by reason of the necessity for precisely centering the arbors; in practice, as will subsequently be described, it is more convenient to crimp first one end of the sleeve and then the other, a single arbor working successively first on one end and then on the other end, and the bearing then being carried on a mandrel on a dog.

Embodiments of the invention will now be described by way of example with reference to the accompanying drawings in which:

FIG. 3 is a section similar to FIG. 1 of a device with one block or arbor and a punch for the second pass (crimping on one side only);

FIG. 4 is a section similar to FIG. 1 of a device with one arbor and a punch for the first pass on one side, and a supporting and centering chuck on the other side;

FIG. 5 is a section similar to FIG. 1 of a device with one arbor and a punch for the second pass, and a supporting and centering chuck on the other side.

Figure 1:
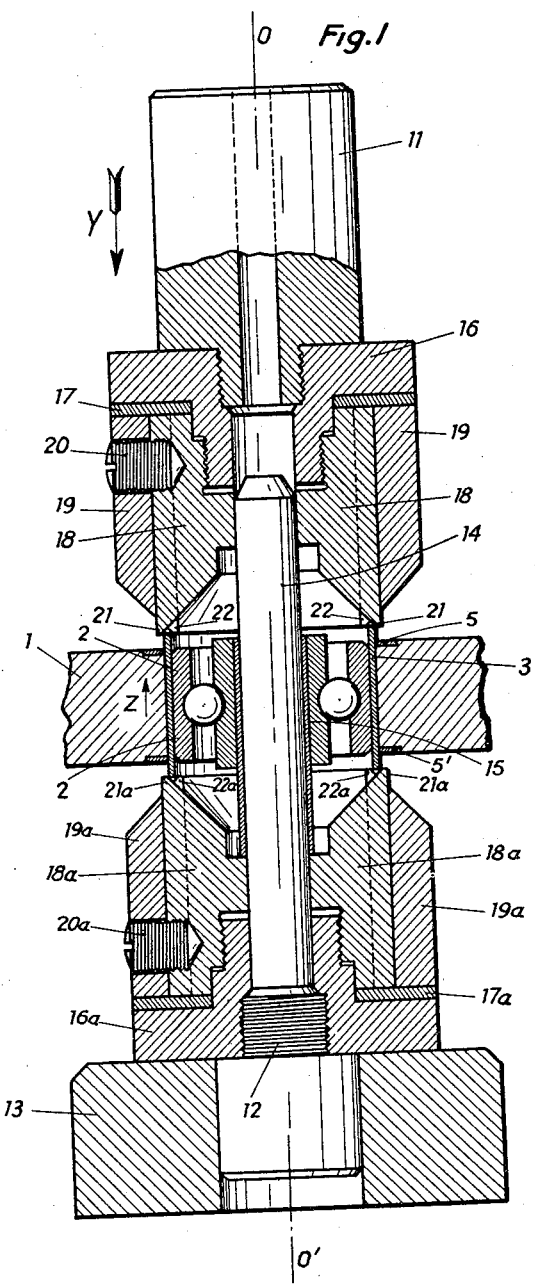
FIG. 1 is an axial section of a device consisting of two arbors and punches on the arbors for the first pass.

With reference first to FIG. 1, the crimping tool for the first pass with two arbors has a top arbor 11 and a bottom arbor 12, the former being mounted on a rocking lever (not shown), and the latter fitting in the central bore of a supporting chuck 13 and integral with a general centering pin or spindle 14 with a radius corresponding in practice to the smallest bore radius to be found in the kind of bearings to be treated; for bores of larger radius, it is sufficient, as shown in FIG. 1 by way of example, to fit on the spindle 14 a bush or sleeve 15 of suitable thickness which forms a centering ring.

Figure 1A:
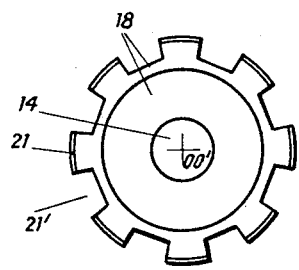
FIGS. 1a and 1b are end views, in the direction of the arrow Z in FIG. 1, of an inner and an outer member respectively of a punch.
Figure 1B:
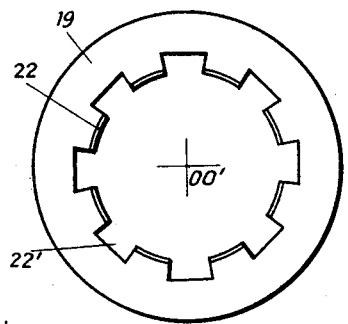

On each arbor is screwed a punch base 16 on which are screwed successively with the interposition of a supporting shim or washer 17, two cylindrical members 18 and 19. These members are concentric and are locked longitudinally with reference to each other by means of a set screw 20. The inner member 18 terminates in a circular leading edge and is crenellated or notched axially to form identical keys 21 of equal width and equidistantly separated by grooves 21'; they are even in number (eight in the example) a frustro-conical wedge face is formed at the end of the member 18, extending at 45° inwards from the end towards the common axis 00' (FIGS. 1 and 1a).

The outer member 19 has a similar profile serrated to form axial keys 22 alternating with axial grooves 22', but has at its end a frusto-conical face extending at 45° outwards from the end and crosswise of the first wedge face so that the ends of the members together form a rim presenting a peripheral V-groove 45° outwards.

In this way, when the assembly of these two members and the components securing them together moves downwards in the direction of the arrow Y, parallel to the axis 00', the keys 21 and 22 coact to sheer at regular intervals the rim of the cylindrical sleeve 3 to be crimped as described in the specification Serial Number 111,672 already cited, and bend through approximately 45° the tongues thus produced; the alternation in the direction of the wedge faces of the members causes said tongues to bend alternately inwards and outwards, and this operation constitutes the first pass of the crimping operation.

In FIG. 1 in which two arbors each carry one punch, there being two identical punches one on each side of the support 1 of the race 2, similar components bear the same reference numerals accompanied by the symbol "a" for the bottom punch supported on the chuck 13 and behaving in exactly the same way as the top punch 18 and 19.

Figure 2:
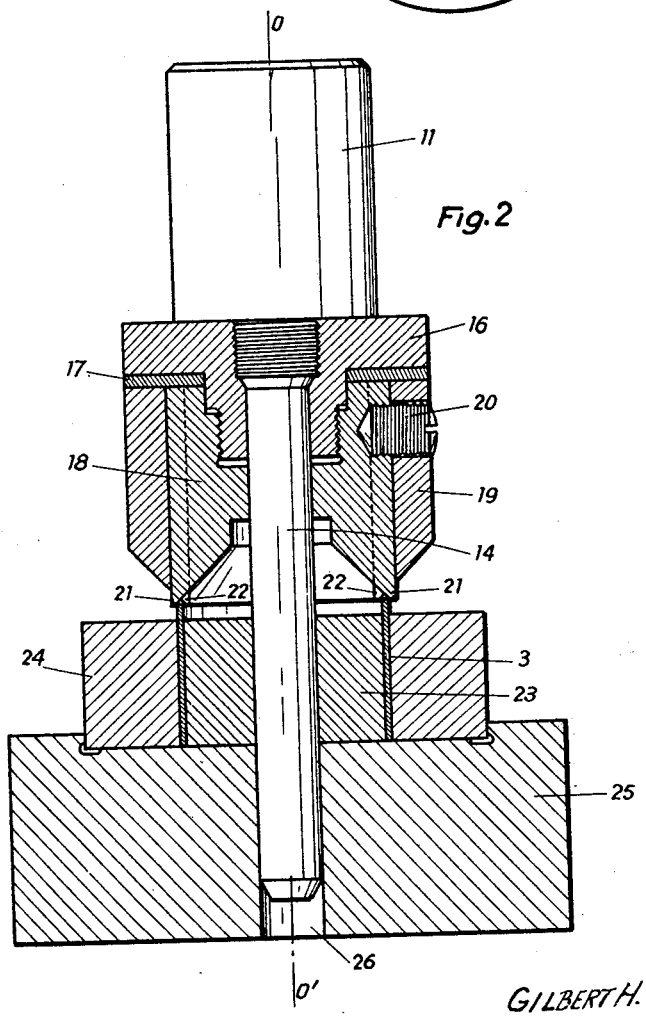
FIG. 2 is a section similar to FIG. 1 of a device with only one arbor and a punch for the first pass (crimping on one side only)

FIG. 2 shows the positioning of a sleeve when, for instance, the general arrangement of the support does not permit the use of a crimping process performed simultaneously on both sides, or again, to avoid the need of excessively finely adjusted centering in an operation of this type.

There is again a top arbor 11 with its punch ready to cut and bend in a preliminary pass the tongues of the sleeve 3. But the latter is held between a mandrel 23 and a guide ring 24 seated on a base 25, mandrel and base being bored at 26 to allow of their being centred by the spindle 14 and having a depth such that the cylindrical body of the sleeve 3 projects sufficiently upwards to permit crimping but does not project between the mandrel and the ring on the one hand and the base on the other hand.

The operation of cutting and bending through 45° is effected as previously, the ring 24 replacing the support 1, and the mandrel 23 replacing the bearing 2. The sleeve thus prepared, on removal from the mandrel 23 and the ring 24, can be stocked for subsequent use; otherwise, it is fitted in its bearing and is placed in the bore of its support (the protective disc or washer 5 not being omitted) to receive the second pass completing the crimping process, as is shown in FIG. 3. In this figure, the arbor 11 carries the single punch 27 for the second pass, which punch flattens the alternate tongues 6 and 6' of the sleeve 3 and has a peripheral rim 28 to restrict the bending of the tongues.

The same operation can be repeated, reversing the places of the punch-carrying arbor and the base forming a double beak in order to crimp the second edge of the sleeve 3.

The arbor used in the second pass can act as a double-beak anvil for an arbor of the first or second pass if it is desired to avoid making the crimping operation simultaneously on both sides of the bearing.

FIG. 4 shows the assembly with the arbor 11 carrying on the upper side the punch 18 and 19 for the first pass, and the arbor 12 carrying on the lower side a punch 27 for the second pass, which punch then acts as a double-beak anvil.

Finally, FIG. 5 shows the assembly for a second crimping pass of the assembled unit; a punch 27a for the second pass is mounted on the arbor 11 and an identical punch 27 acts as a double-beak anvil, as in FIG. 4.

We claim:

1. A punch for use in crimping the cylindrical holding sleeve of a ball or roller bearing, comprising an annular device having at its rim a continuous peripheral series of wedge faces with adjacent wedge faces sloped oppositely to each other and disposed crosswise relatively to each other so that the series of wedge faces presents a peripheral V-groove to receive the rim of the sleeve, and relative axial movement between the device and the sleeve causes simultaneously axial shearing of the sleeve rim into a peripheral series of tongues, and bending of adjacent tongues in opposite directions.

2. A punch for use in crimping the cylindrical holding sleeve of a ball or roller bearing, comprising a pair of inner and outer co-axial cylindrical members, a continuous peripheral series of axially extending keys and grooves on the members, the keys of one member engaging in the grooves of the other member, means for preventing axial displacement of the members relatively to each other, and frusto-conical wedge faces at adjacent ends of the members, the wedge face of one member being sloped oppositely to and disposed crosswise of the wedge face of the other member so that the ends of the members together form a rim presenting a peripheral V-groove to receive the rim of the sleeve, and relative axial movement between the members on the one hand and the sleeve on the other hand causes simultaneously axial shearing of the sleeve rim into a peripheral series of tongues, and bending of adjacent tongues in opposite directions.

3. A punch according to claim 2 wherein the frusto-conical wedge faces are disposed so as to bend the sleeve's tongues through approximately 45° for subsequent flattening by a suitable punch to positions at right angles to the bearing axis.

References Cited in the file of this patent

UNITED STATES PATENTS

| 1,903,776 | Clark et al. | Apr. 18, 1933 |
| 2,830,642 | Wallberg | Apr. 15, 1958 |

FOREIGN PATENTS

| 644,682 | France | June 18, 1928 |